US012374200B2

(12) United States Patent
Lamb et al.

(10) Patent No.: US 12,374,200 B2
(45) Date of Patent: *Jul. 29, 2025

(54) SECURITY APPARATUS AND METHOD

(71) Applicant: Universal Electronics Inc., Scottsdale, AZ (US)

(72) Inventors: Michael Lamb, Rancho Santa Fe, CA (US); Jay Stone, San Marcos, CA (US); Michael Bailey, Carlsbad, CA (US); George Seelman, Temecula, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/332,339

(22) Filed: Jun. 9, 2023

(65) Prior Publication Data

US 2023/0316882 A1 Oct. 5, 2023

Related U.S. Application Data

(62) Division of application No. 17/752,172, filed on May 24, 2022, now Pat. No. 11,715,357, which is a division of application No. 17/117,866, filed on Dec. 10, 2020, now Pat. No. 11,348,420, which is a division of application No. 16/729,615, filed on Dec. 30, 2019, now Pat. No. 10,885,752, which is a division of application No. 16/281,357, filed on Feb. 21, 2019, now Pat. No. 10,522,011, which is a division of application No. 15/683,227, filed on Aug. 22, 2017, now Pat. No. 10,223,880, which is a division of application No. 14/860,558, filed on Sep. 21, 2015, now Pat. No. 9,761,097, which is a division of application No. 13/224,210, filed on Sep. 1, 2011, now Pat. No. 9,142,108.

(51) Int. Cl.
*G08B 13/08* (2006.01)
*G08B 29/18* (2006.01)

(52) U.S. Cl.
CPC ........... *G08B 13/08* (2013.01); *G08B 29/185* (2013.01)

(58) Field of Classification Search
CPC .............................. G08B 13/08; G08B 29/185
USPC ...................................................... 340/545.1
See application file for complete search history.

(56) References Cited

U.S. PATENT DOCUMENTS

| | | | |
|---|---|---|---|
| 5,712,621 | A | 1/1998 | Anderson |
| 5,872,514 | A | 2/1999 | Neas |
| 5,936,522 | A | 8/1999 | Vogt |
| 6,310,549 | B1 | 10/2001 | Loftin et al. |
| 6,388,572 | B1 | 5/2002 | Salter |
| 6,778,086 | B2 | 8/2004 | Morrone et al. |
| 6,943,686 | B2 | 9/2005 | Allen |

(Continued)

*Primary Examiner* — Eric Blount
(74) *Attorney, Agent, or Firm* — Greenberg Traurig, LLP

(57) ABSTRACT

A method and apparatus for monitoring a door or a window is disclosed. In one embodiment, a method is described, comprising receiving, by a processor, an electronic signal from a motion sensor in response to movement of the door or window, determining a direction of movement of the door or window from the electronic signal by the processor, comparing the direction of movement to a predetermined direction by the processor, detecting, by the processor, an alarm condition of the door or window if the electronic signal indicates that the door or window is being opened, and transmitting, by a transmitter coupled to the processor, an alarm signal when the alarm condition has been detected.

18 Claims, 8 Drawing Sheets

(56) References Cited

U.S. PATENT DOCUMENTS

| | | | |
|---|---|---|---|
| 7,081,813 | B2 | 7/2006 | Winick et al. |
| 7,242,297 | B2 | 7/2007 | Vogt |
| 7,456,736 | B2 | 11/2008 | Primm et al. |
| 7,504,942 | B2 | 3/2009 | Marman |
| 7,680,299 | B2 | 3/2010 | Hosoi |
| 7,692,542 | B2 | 4/2010 | Outzs |
| 7,916,018 | B2 | 3/2011 | Eskildsen |
| 8,009,041 | B2 | 8/2011 | Graichen |
| 8,230,645 | B2 | 7/2012 | Luca et al. |
| 8,400,301 | B1 | 3/2013 | Kersch et al. |
| 8,773,263 | B2 | 7/2014 | Thibault |
| 9,142,108 | B2 | 9/2015 | Seelman et al. |
| 9,959,745 | B2 | 5/2018 | Lamb et al. |
| 2003/0218541 | A1 | 11/2003 | Sakai |
| 2004/0090327 | A1 | 5/2004 | Soloway et al. |
| 2006/0220834 | A1 | 10/2006 | Maeng |
| 2006/0288527 | A1 | 12/2006 | Van Vliet |
| 2007/0139195 | A1 | 6/2007 | Jin et al. |
| 2009/0140858 | A1 | 6/2009 | Gore et al. |
| 2009/0167538 | A1 | 7/2009 | Merritt et al. |
| 2010/0019902 | A1 | 1/2010 | Mullet |
| 2013/0057404 | A1 | 3/2013 | Thibault |

SECURITY APPARATUS AND METHOD

CROSS-REFERENCE TO RELATED APPLICATIONS

The present application is a divisional of U.S. patent application Ser. No. 17/752,172 filed on May 24, 2022, which is a divisional of U.S. patent application Ser. No. 17/117,866 filed on Dec. 10, 2020, now U.S. Pat. No. 11,348,420, which is a divisional of U.S. patent application Ser. No. 16/729,615, filed on Dec. 30, 2019, now U.S. Pat. No. 10,885,752, which is a divisional of U.S. patent application Ser. No. 16/281,357, filed on Feb. 21, 2019, now U.S. Pat. No. 10,522,011, which is a divisional of U.S. patent application Ser. No. 15/683,227, filed on Aug. 22, 2017, now U.S. Pat. No. 10,223,880, which is a divisional of U.S. patent application Ser. No. 14/860,558, filed on Sep. 21, 2015, now U.S. Pat. No. 9,761,097, which is a divisional of U.S. patent application Ser. No. 13/224,210, filed on Sep. 1, 2011, now U.S. Pat. No. 9,142,108.

BACKGROUND

Field of Use

The present application relates to the field of home security. More specifically, the present application relates to door and window sensors typically used in home and businesses.

Description of the Related Art

Security systems for homes and offices have been around for many years. Often, these systems make use of door and window sensors installed onto some or all of the doors and windows found in a structure. These sensors typically comprise two distinct parts: a magnet and a reed switch. The magnet is typically installed onto a movable part of a window or onto a door edge, while the detector is mounted to a stationary surface, such as a door or window frame. When the door or window is closed, the magnet and reed switch are in close proximity to one another, maintaining the reed switch in a first state indicative of a "no alarm" condition. If the door or window is opened, proximity is lost between the magnet and the reed switch, resulting in the reed switch changing state, e.g., from closed to open or from open to closed. The change of state is indicative of an alarm condition, and a signal may be generated by circuitry associated with the reed switch and sent, via wires or over-the-air, to a central processing station, either in the home or at a remote monitoring station. Alternatively, or in addition, a loud audible alert is generated, either at the central processing station in the home or directly by the circuitry associated with the reed switch, indicating that a door or window has been opened without authorization.

One of the disadvantages of typical door and window alarms is that they do not allow for conditions other than "door/window open" and "door/window closed". For example, one might like to open a window a few inches to let air inside a home, but also to be alerted if the window were to be opened further than the initial position set by the homeowner.

Another disadvantage of present door and window alarms is the inflexibility of these prior art alarm devices to detect anything other than a door/window open or door/window closed state.

Thus, it would be desirable to provide a security sensor that allows more flexibility than present door and window sensors to determine when a true alarm condition has been triggered, while additionally allowing a door or window to be opened slightly without triggering an alarm event.

SUMMARY

The embodiments described herein relate to security methods and apparatus. In one embodiment, a method is described, comprising receiving, by a processor, an electronic signal from a motion sensor in response to movement of the door or window, determining a direction of movement of the door or window from the electronic signal by the processor, comparing the direction of movement to a predetermined direction by the processor, detecting, by the processor, an alarm condition of the door or window if the electronic signal indicates that the door or window is being opened, and transmitting, by a transmitter coupled to the processor, an alarm signal when the alarm condition has been detected.

In another embodiment, an apparatus is described, comprising a memory for storing a set of processor-executable instructions, a motion sensor for generating an electronic signal in response to movement of the door or window, a transmitter, and a processor coupled to the memory, the motion sensor, and the transmitter, for executing the set of processor-executable instructions that cause the apparatus to receive, by the processor, the electronic signal from the motion sensor in response to movement of the door or window, determine, by the processor, a direction of movement of the door or window from the electronic signal by the processor, compare the direction of movement to a predetermined direction by the processor, detect, by the processor, an alarm condition associated with the door or window if the electronic signal indicates that the door or window is being opened, and causing the transmitter to transmit an alarm signal when the alarm condition has been detected.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to security methods and apparatus for allowing configurable positioning of doors and windows without triggering alarm events. In particular, the embodiments presented below monitor doors and windows for an "alarm condition", comprising movement of a security apparatus attached to a door or a window, movement of the security apparatus/door/window in a particular direction, a velocity change of the security apparatus/door/window, a position change of the security apparatus/door/window, or a combination of these.

Figure 1A:
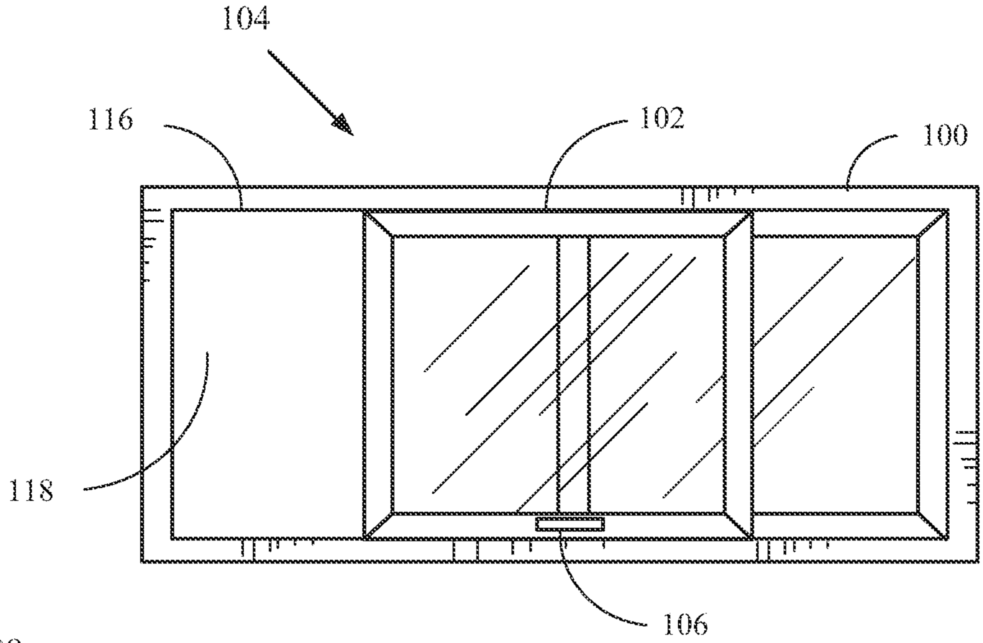
FIGS. 1*a*-1*c* illustrate two examples of a typical sliding window assembly and one example of a door installed in a home, office, or other structure, each of these examples having a security apparatus attached.
Figure 1B:
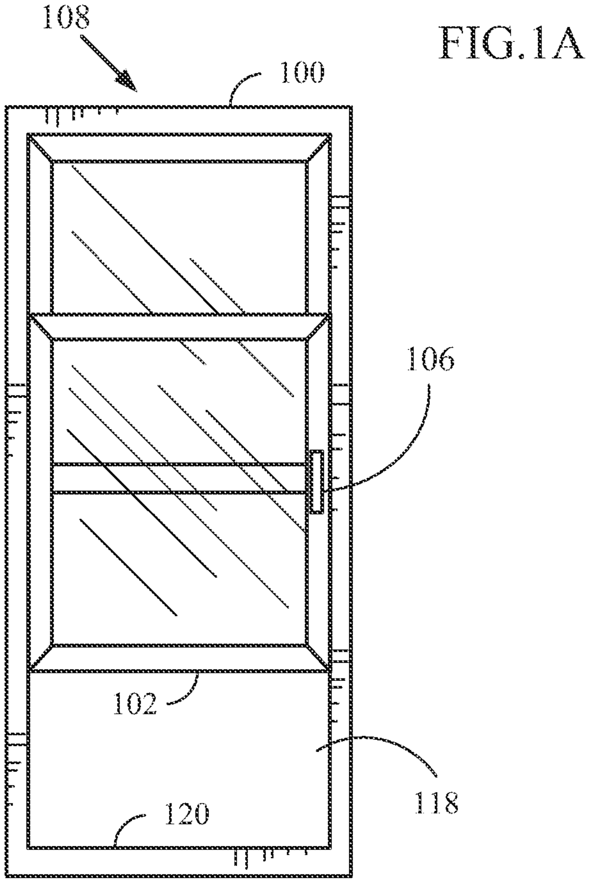
Figure 1C:
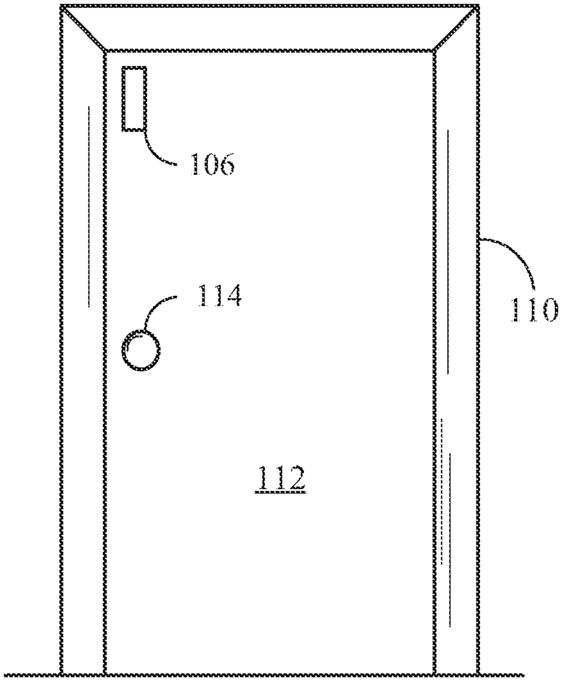

FIGS. 1*a*-1*c* illustrate two examples of a typical sliding window assembly 104 and 108 and one example of a door 112 installed in a home, office, or other structure, each of the examples having a security apparatus 106 attached in accordance with the teachings herein. In FIGS. 1*a* and 1*b*, a window frame 100 delineates the boundary of window assembly 104 and defines a window opening. In FIG. 1*c*, a door frame 110 delineates the boundary of the door 112 (shown in a closed position) and defines a door opening. The door 112 typically further comprises a doorknob 114 for opening the door.

Security apparatus 106 comprises a one-piece design mounted to a movable portion 102 of window assemblies 104 and 108. The moveable portion 102 is typically mounted within one or more tracks found within window frame 100 and allows movable portion 102 to slide within the track, thereby forming a variable opening 118 through each window assembly, respectively. The variable opening 118 is formed as the movable portion 102 slides horizontally within frame 100, being reduced to zero as movable portion 102 is positioned against the left edge 116 and being maximized when movable portion 102 is positioned as far away as possible from left edge 116. Similarly, in FIG. 1B, the variable opening 118 is formed as movable portion 102 slides vertically within frame 100, being reduced to zero as movable portion 102 is positioned against lower edge 120 and being maximized when movable portion 102 is positioned as far away as possible from lower edge 120. In FIG. 1*c*, a variable door opening is formed as the door 112 is opened.

Security apparatus 106 may be mounted to a top corner portion of door 112 as shown in FIG. 1*c*, although it could be mounted wherever practical. Security apparatus 106 senses an alarm condition, such as movement of the door as it is opened and closed.

Unlike prior art door and window security devices, security apparatus 106 uses a self-contained motion-sensing device to detect alarm conditions associated with doors or windows. Thus, the installation of opposing magnets onto door and window frames used in reed switch-type devices is unnecessary.

A user of security apparatus 106 may want to keep a window or door slightly open to let in cool outdoor air, but would also like to be alerted if an intruder were to open the door or window further than what the user has initially set. In one embodiment, the user may position the door or window into an initial open position before arming security apparatus 106. In another embodiment, the user may temporarily disable security apparatus 106 while the door or window is placed in an initial open position. Then, the user arms security apparatus 106. Subsequently, if the door or window is moved from the initial opening set by the user, security apparatus 106 will generate an alarm, indicating, perhaps, that an intruder is attempting to gain entry to the home or business by opening the door or window further than the initial opening. In another embodiment, an alarm is generated only if the door or window is moved in a direction which increases the opening.

Figure 2:
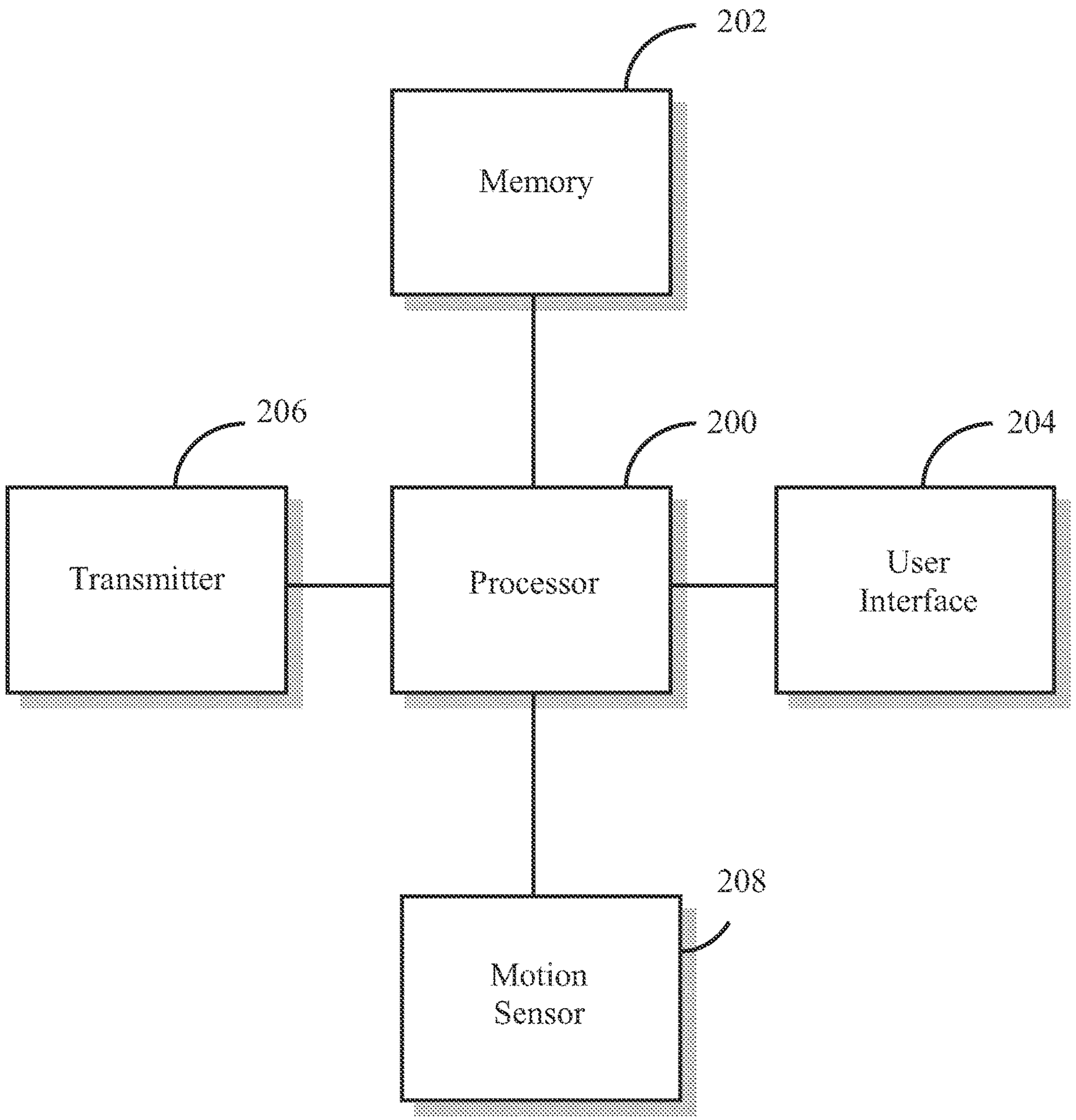
FIG. 2 is a functional block diagram of one embodiment of the security apparatus shown in FIGS. 1*a*-1*c*.

FIG. 2 is a functional block diagram of one embodiment of security apparatus 106. Specifically, FIG. 2 shows processor 200, memory 202, user interface 204, and transmitter 206. It should be understood that not all of the functional blocks shown in FIG. 2 are required for operation of security apparatus 106 (for example, transmitter 206 may not be necessary), that the functional blocks may be connected to one another in a variety of ways, and that not all functional blocks necessary for operation of security apparatus 106 are shown (such as a power supply), for purposes of clarity.

Processor 200 is configured to provide general operation of security apparatus 106 by executing processor-executable instructions stored in memory 202, for example, executable code. Processor 200 typically comprises a general purpose processor, such as an ADuC7024 analog microcontroller manufactured by Analog Devices, Inc. of Norwood Massachusetts, although any one of a variety of microprocessors, microcomputers, and/or microcontrollers may be used alternatively.

Memory 202 comprises one or more information storage devices, such as RAM, ROM, EEPROM, UVPROM, flash memory, CD, DVD, Memory Stick, SD memory, XD memory, thumb drive, or virtually any other type of electronic, optical, or mechanical memory device. Memory 202 is used to store the processor-executable instructions for operation of security apparatus 106 as well as any information used by processor 200, such as threshold information, parameter information, identification information, status information, door or window position set points, etc.

User interface 204 is coupled to processor 200 and allows a user to control operation of security apparatus 106 and/or to receive information from security apparatus 106. User interface 204 may comprise one or more pushbuttons, switches, sensors, keypads, and/or microphones that generate electronic signals for use by processor 200 upon initiation by a user. User interface 204 may additionally comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of information to a user. In one embodiment, user interface 204 comprises a multi-colored LED displaying red or green indications, red indicating an alert condition and green indicating a non-alert condition. In another embodiment, red indicates that security apparatus 106 requires a reset (described later herein with respect to FIG. 7) and green indicates normal operation. Of course, the aforementioned items could be used alone or in combination with each other and other devices may be alternatively, or additionally, used.

Optional transmitter 206 comprises circuitry necessary to transmit signals from security apparatus 106 to remote destinations, such as a home or office central security unit, or a location remote from the structure where security apparatus 106 is installed. Such circuitry is well known in the art and may comprise BlueTooth, Wi-Fi, RF, optical, or ultrasonic circuitry, among others. Alternatively, or in addition, transmitter 206 comprises well-known circuitry to provide signals to a remote destination via wiring, such as telephone wiring, twisted pair, two-conductor pair, CAT wiring, or other type of wiring.

Motion sensor 208 detects motion of security apparatus 106 and, thus, motion of a door or window to which security apparatus 106 is installed. In one embodiment, motion sensor 208 comprises an accelerometer, such as an ADXL345 manufactured by Analog Devices, of Norwood, Massachusetts. In another embodiment, motion sensor 208 comprises a gyroscope, such as the LPY530AL analog gyroscope manufactured by STmicroelectronics of Geneva, Switzerland. In another embodiment, both an accelerometer and a gyroscope are used together, acting as motion sensor 208. Generally, both of these devices are capable of generating electrical signals that represent an acceleration, a velocity, an angular velocity and/or a position relating to an object to which they are mounted. In another embodiment, one or more of these attributes is determined mathematically using one of the other attributes. For example, a position of security apparatus 106/door/window may be determined by twice integrating an acceleration signal from motion sensor 208 by processor 200.

One or more signals from motion sensor 208 are provided to processor 200 during operation of security device 106. For example, when a door or window is opened, this creates an acceleration, a velocity, an angular velocity, and/or a position change of security apparatus 106 that is detected by motion sensor 208 which, in turn, generates an electrical signal related to the motion of the security apparatus 106.

Figure 3:
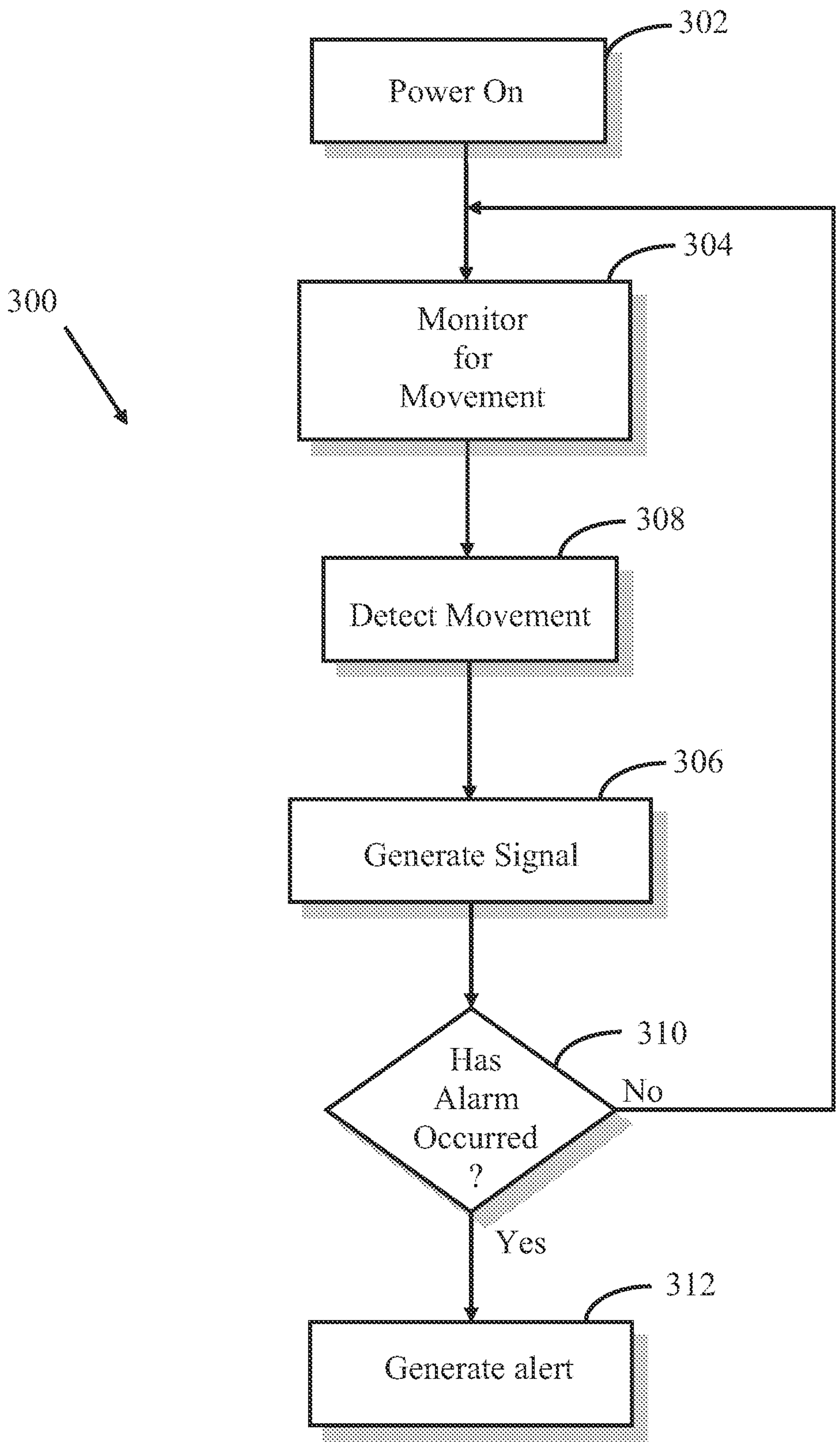
FIG. 3 is a flow diagram illustrating one embodiment of a method for providing an alarm for a door or a window using a motion-sensing device.

FIG. 3 is a flow diagram illustrating one embodiment of a method 300 for providing an alarm for a door or a window using a motion-sensing device.

At block 302, security apparatus 106 is powered on by a user.

At block 304, processor 200 and/or motion sensor 208 monitors for movement of the door or window to which security apparatus 106 is attached. In one embodiment, components of security apparatus 106 maintain a low-power state of operation while motion sensor 208 monitors for movement of security apparatus 106. Motion sensor 208 may be designed to also maintain a low-power state until movement is detected, then energizes other parts of its circuitry to provide signals to processor 200 indicative of the movement, for example, a signal related to acceleration, velocity, or position of security apparatus 106. Motion sensor 208 may also provide a signal to processor 200 and/or other circuitry alerting processor 200/other circuitry to the initial detection of movement, thereby allowing processor 200/other circuitry to enter an active state of operation.

At block 306, motion sensor 208 detects an initial movement of security apparatus 106 by evaluating acceleration, velocity, angular velocity, and/or position of the door or window to which security apparatus 106 is attached. Generally, this occurs upon an initial change in acceleration, velocity, or position of the window.

In one embodiment, both an accelerometer and a gyroscope are used as motion sensor 208. Upon determining an initial movement of the door or window, the accelerometer provides a signal to the gyroscope and, optionally, to processor 200 as well. The signal from the accelerometer alerts the gyroscope to begin providing information regarding the angular velocity of the door or window to processor 200. The angular velocity is used by processor 200 to determine movement and position of the door or window, as explained below. The gyroscope, processor 200, user interface 204, memory 202, and transmitter 206 may all maintain a low-power state of operation until a signal is received from the accelerometer indicating an initial movement of the door or window.

Figure 4:
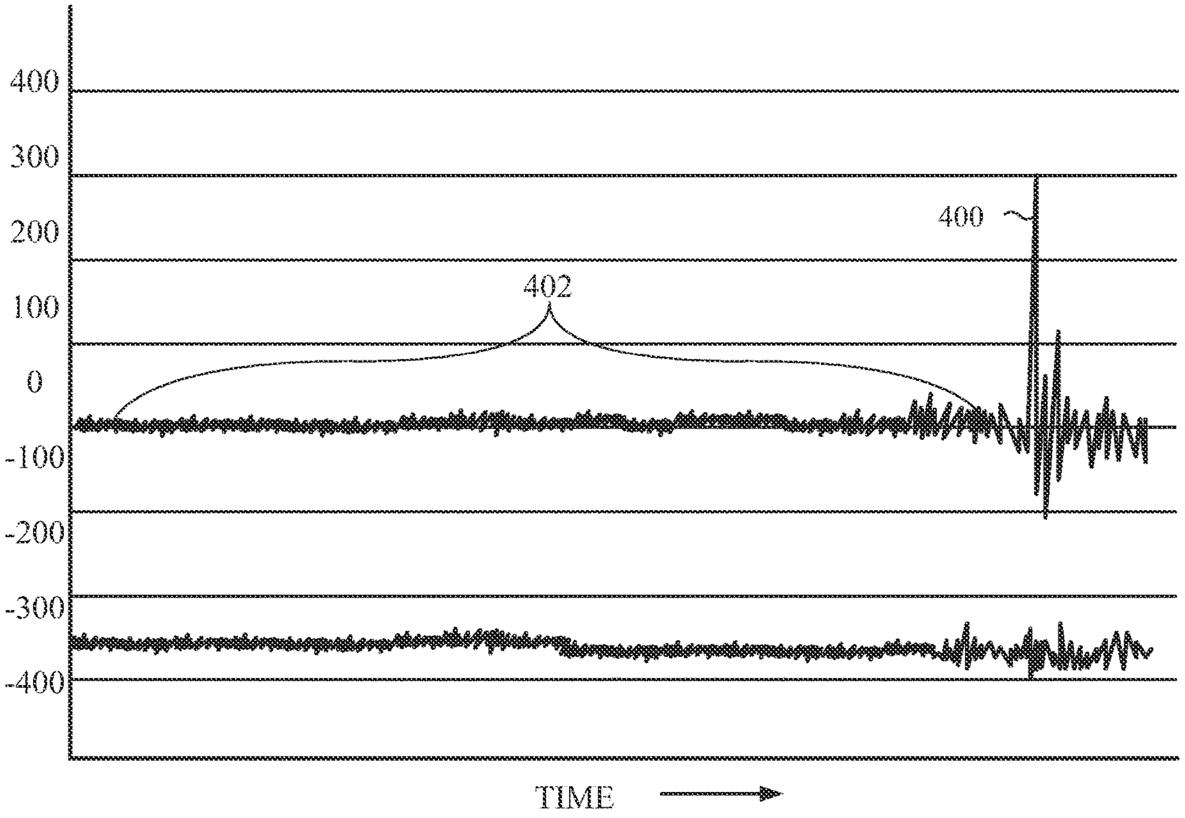
FIG. 4 is an illustration of a time-domain representation of an acceleration signal generated by a motion sensor within the security apparatus of FIGS. 1*a*-1*c* and FIG. 2.

At block 308, motion sensor 208 typically generates a signal relating to the initial and/or subsequent movement of security apparatus 106. Such a signal may comprise an analog voltage or current, or one or more digital signals. An example of a time-domain representation of an acceleration signal is shown in FIG. 4. This shows a voltage output 400 of a typical accelerometer, first during a time period where little or no acceleration is present (402), then spiking to a relatively high voltage (400) during an acceleration of security apparatus 106, for example, during in initial time period after a door or window is first moved. A closer inspection of FIG. 4 reveals a large, initial spike, representing the initial movement, followed by a series of successively smaller spikes, representing subsequent movement. Thus, the signal provided by motion sensor 208 typically comprises components of amplitude, frequency, and time. In any case, the signal generated at block 308 is typically provided to processor 200.

At block 310, processor 200 receives the signal generated by motion sensor 208 and determines whether the signal from motion sensor 208 indicates that an alarm condition has occurred. This may be achieved in a variety of ways, by comparing the electronic signal from motion senor 208 to one or more data points. Data points, as used herein, comprise one or more voltages, currents, velocities, angular velocities, accelerations, positions, time, profiles (such as an alarm profile representing an alarm condition or a false alarm profile, representing a false alarm condition), or a combination of any of these. Thus, data points may comprise a single level, such as a voltage level, a combination of a level and a time, or a discrete or continuous waveform, as discussed below.

In one embodiment, the determination of whether an alarm condition has occurred is made by storing one or more pre-determined data points within memory 202 that represent an alarm condition in the form of an acceleration, a velocity, an angular velocity, and/or a position of security apparatus 106/window/door as it/they is/are moved in at least one axis. Processor 200 compares at least a portion of the electronic signal from motion sensor 208 to at least a portion of one or more of the data points. In one embodiment, the data points comprise a discrete or continuous waveform. If a substantial match between the electronic signal from motion sensor 208 and the data points occur, a substantial match is detected, and processing continues to block 312, where an alert is generated. A substantial match may be declared if the electronic signal from motion sensor 208 matches one or more of the data points within a predetermined margin of error. For example, if the signal from motion sensor 208 is within 2% of the data points stored in memory 202, a match may be declared. In one embodiment, only a portion of the signal from motion sensor 208 is compared to the data points stored in memory 202. For example, only 800 milliseconds of the signal after it crosses a predetermined threshold is compared to the data points stored in memory.

In another embodiment, alternatively or in addition to the embodiment described above, data points representing one or more false alerts may be stored in memory 202. For example, a false alert profile might comprise storing one or more pre-determined data points within memory 202 that represent an acceleration, a velocity, an angular velocity, and/or a position of security apparatus 106/window/door as it/they is/are moved in at least one axis as a large truck passes by, as a loud jet flys by, as a result of an earthquake, or some other source of a potential false alert. If processor 200 determines that the signal from motion sensor 208 substantially matches false alert data points, much like the process described above with respect to determining a substantial match between a signal from motion sensor 208 and alarm condition data points, a false alert is detected, no alert is generated, and processing loops back to block 304. In one embodiment, information relating to the false alert, such as a time of occurrence and/or an identification of a likely cause of the false alert (e.g., truck, aircraft, earthquake) matching false alert profile, may be generated and saved in memory 202 and/or provided to an individual via user interface 204 and/or transmitter 206.

In another embodiment, alternatively or in addition to the embodiments described above, the data points comprise at least a first threshold and a second threshold that are stored in memory 202. The first threshold relates to a signal level and the second threshold relates to a signal time period. In this embodiment, processor 200 determines that security apparatus 106/door/window has been moved if the signal from motion sensor 208 exceeds the first threshold for a time period greater than the second threshold. In a related embodiment, processor 200 determines that security apparatus 106/door/window has been moved if the signal from motion sensor 208 exceeds the first threshold for a time not more than the second threshold. In this embodiment, it is assumed that many sources of false alarms, such as large trucks passing by, loud jets flying by, earthquakes, etc., will last much longer than the time it takes to re-position a door or a window. Thus, if a strong signal from motion sensor 208 lasts only a relatively short time period, for example less than one second, it may be assumed that this is representative of a door or window opening, rather than a false alarm condition, whose corresponding signal from motion senor 208 may last for a relatively long time period, e.g., greater than the second threshold time period.

In still another embodiment, alternatively or in addition to the embodiments described above, data points comprise a first threshold that is stored in memory 202 representing a predetermined signal level from motion sensor 208, as well as a predefined number. Processor 200 compares the signal from motion sensor 208 and determines motion sensor 208/door/window movement if the signal from motion sensor 208 crosses the first threshold a number of times greater than the predefined number. This indicates that the signal from motion sensor 208 is "active" for a predetermined time. In a related embodiment, processor 200 determines that security apparatus 106/door/window has been moved if the signal from motion sensor 208 crosses the first threshold a number of times greater than the predefined number within a predetermined time period.

In still yet another embodiment, alternatively or in addition to the embodiments described above, the data points comprise multiple thresholds that are stored in memory 202, each of the thresholds related to a signal level. In addition, the data points further comprise one or more time periods that are stored in the memory, each relating to a time period between signal spikes from motion sensor 208. The data points may further comprise margins that may be associated with the thresholds and the time periods. Processor 200 compares the signal from motion sensor 208 to these thresholds and determines a security apparatus 106/door/window movement if at least a predetermined number of the signal spikes from motion sensor 208 are each within a respective range of level thresholds, defined by the thresholds plus the margins, and if the spikes occur within successive time periods, including the time margins. An example of this methodology can be seen in FIG. 5.

Figure 5:
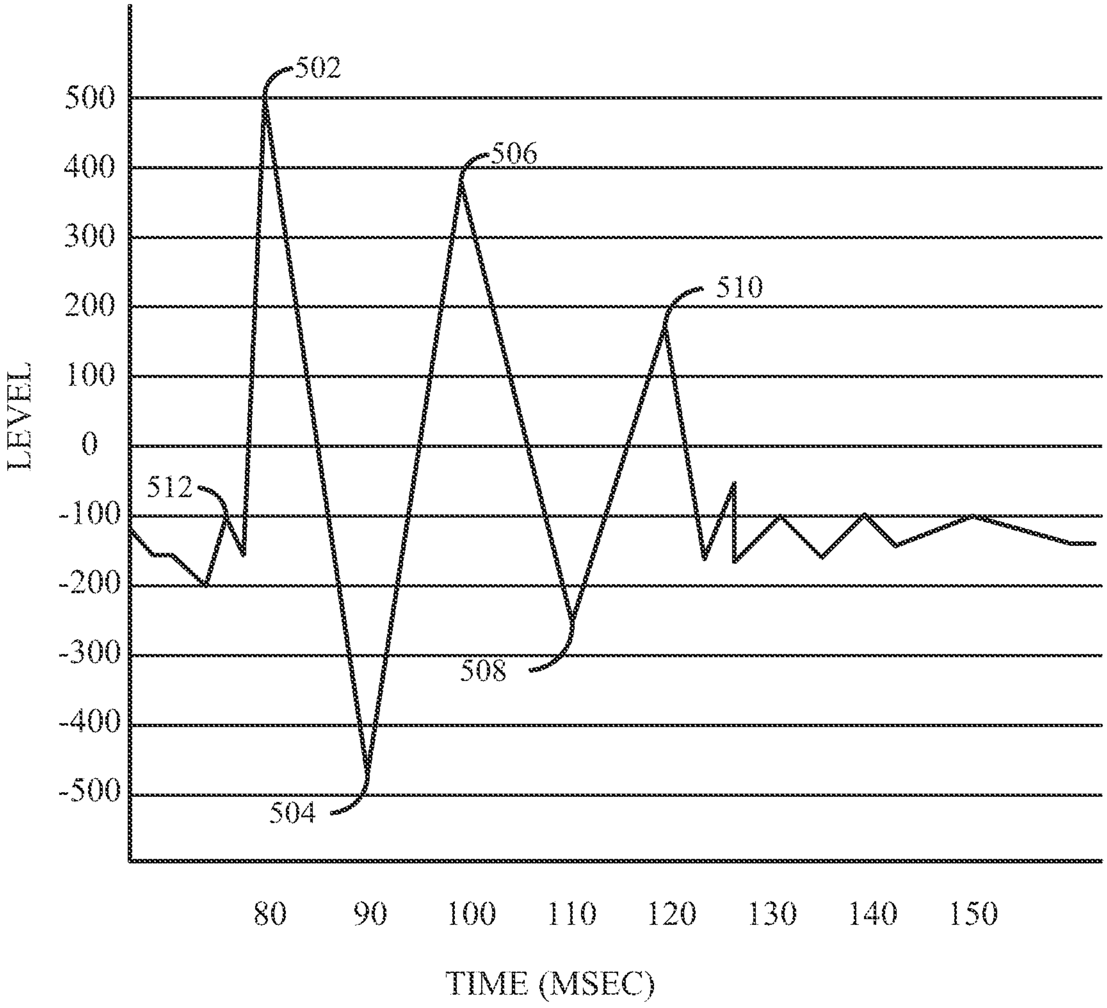
FIG. 5 illustrates a time-domain representation of an acceleration signal from the motion sensor within the security apparatus of FIGS. 1*a*-1*c* and FIG. 2 as the security apparatus is being moved.

FIG. 5 illustrates a time-domain representation of an acceleration signal from motion sensor 208 as security apparatus 106/window/door is being moved, although in other embodiments, waveforms representing velocity, angular velocity, position, etc. may be used. As shown, the level of the signal from motion sensor 208 is at or near zero volts for an initial time period (reference numeral 512), then spiking to a first level of 500 millivolts, represented by reference numeral 502. At 10 milliseconds later, the voltage spike from motion sensor 208 reaches −470 millivolts (reference numeral 504), followed by another positive spike up to 400 millivolts 9 milliseconds after the negative (reference numeral 506). Next, the signal level from motion sensor 208 spikes down to −250 millivolts (reference numeral 508) 11 milliseconds after spike 506, then jumps to 175 millivolts (reference numeral 510) 10 milliseconds after spike 508. Further spikes occur after spike 508, diminishing in amplitude as time progresses.

In one embodiment, data points comprise amplitude levels, time, and margins associated with the amplitudes and time. For instance, in this example, five thresholds are stored within memory 202: a first threshold at 500 millivolts, a second threshold at −450 millivolts, a third threshold at 420 millivolts, a fourth threshold at −250 millivolts, and a fifth threshold at 170 millivolts. In one embodiment, each of these thresholds has associated with them a margin of plus or minus 25 millivolts. In addition, a time period of 10 milliseconds is stored in memory 202, representative of a time period between spikes that might be expected during movement of security apparatus 106/window/door. A time margin of plus or minus 1 millisecond is also stored in memory.

In one embodiment, motion sensor 208 provides a signal output even when no motion is detected, as illustrated by the signal referenced by numeral 512. In another embodiment, motion sensor provides a signal only after motion is detected, for example when spike 502 exceeds a predetermined threshold. In any case, the signal from motion sensor 208 is analyzed by processor 200 to determine if it substantially conforms to the threshold numbers stored in memory 202.

Processor 200 first determines that spike 502 measures 500 millivolts and compares it to the first threshold stored in memory 202, equal to 500 millivolts. Since the actual voltage matches the stored first threshold exactly, processor 200 continues to process the next voltage spike 504.

Processor 200 determines that spike 504 equals −470 millivolts and that the second threshold equals −450 millivolts, plus or minus 25 millivolts. Processor 200 compares the voltage at spike 504 (−470 millivolts) to the second threshold (−425 millivolts to −475 millivolts) and determines that the amplitude of spike 504 falls within the range of the second threshold plus margin. Processor 200 also determines that spike 504 occurred 10 milliseconds after spike 502 and compares this value to the first time period stored in memory 202, e.g., 10 milliseconds plus or minus 1 millisecond. Since the time period between spikes 502 and 504 fall within range of the second time period of 10 milliseconds, plus or minus 1 millisecond, processor 200 moves to analyze spike 506.

Processor 200 determines that spike 506 equals 400 millivolts and that the third threshold equals 420 millivolts, plus or minus 25 millivolts. Processor 200 compares the voltage at spike 506 (400 millivolts) to the third threshold (420 millivolts, plus or minus 25 millivolts) and determines that the amplitude of spike 506 falls within range of the third threshold, plus margin. Processor 200 also determines that spike 506 occurred 9 milliseconds after spike 504 and compares this value to the second time period stored in memory 202, e.g., 10 milliseconds plus or minus 1 millisecond. Since the time period between spikes 504 and 506 falls within range of the time period of between 9 and 11 milliseconds, processor 200 moves to analyze spike 508.

Processor 200 determines that spike 508 equals −250 millivolts and that the fourth threshold equals −250 millivolts, plus or minus 25 millivolts. Processor 200 compares the voltage at spike 508 (−250 millivolts) to the fourth threshold (−250 millivolts, plus or minus 1 millivolt) and determines that spike 508 falls within the range of the fourth threshold, plus margin. Processor 200 also determines that the amplitude of spike 508 occurred 11 milliseconds after spike 506 and compares this value to the fourth time period stored in memory 202, e.g., 10 milliseconds plus or minus 1 millisecond. Since the time period between spikes 508 and 510 falls within range of the time period of between 9 and 11 milliseconds, processor 200 moves to analyze spike 510.

Processor 200 determines that spike 510 equals 175 millivolts and that the fifth threshold equals 170 millivolts, plus or minus 25 millivolts. Processor 200 compares the voltage at spike 510 (175 millivolts) to the fifth threshold (170 millivolts, plus or minus 1 millivolt) and determines that the amplitude of spike 510 falls within range of the fourth threshold, plus margin. Processor 200 also determines that spike 508 occurred 11 milliseconds after spike 506 and compares this value to the third time period stored in memory 202, e.g., 10 milliseconds plus or minus 1 millisecond. Since the time period between spikes 506 and 508 falls within range of the time period of between 9 and 11 milliseconds, processor 200 determines that the signal from motion sensor 208 indicates that a door or window has been moved, based on voltage spikes 502-510 substantially matching the values stored in memory 202.

In yet still another embodiment, any of the embodiments described above may further be enhanced by determining a direction of travel of motion sensor 208 and/or a door or window as part of the alarm condition detection processes of block 310. The direction of movement may be used to determine if a door or window is moving in a direction that increases the door or window opening to generate an alarm only if the opening is being increased. In one embodiment, an indication of the direction of movement, e.g., up, down, right, left, clockwise, counter-clockwise, may be determined by sensing the polarity of the initial spike in the signal provided by motion sensor 208. For example, in the signal shown in FIG. 5, an initial spike 502 is shown as a positive voltage (or current). This may indicate that the window or door is being moved in a particular direction, for example from left to right as shown in FIG. 1*c*, indicating an increase in opening 118. Similarly, an initial negative voltage spike of the signal from motion sensor 208 may indicate movement in a direction opposite to the direction indicated by a positive voltage or current, e.g., that opening 118 is decreasing. If processor 200 determines that movement of security apparatus 106/door/window has occurred, but in a direction that indicates a reduction in opening 118, an alert may be averted, and processing reverts back to block 304. If, however, the direction of motion of security apparatus 106/door/window is determined to increase opening 118, then processing continues to block 312, where an alert is generated. In another embodiment, the direction of movement of security apparatus 106/door/window is simply an additional piece of information that is used to generate an alert at block 312.

At block 312, an alert is generated, indicating an alarm condition, e.g., movement of the door or window, movement of the door or window in a particular direction, movement of the door or window greater than a predetermined amount, movement of the door or window in a particular direction more than a predetermined amount, velocity change of the door or window, position change of the door or window, an acceleration of the door or window, an acceleration of the door or window greater than a predetermined amount, etc.

The alert may comprise an audible alert generated locally by security apparatus 106 via a component of user interface 204, such as a speaker. Alternatively, or in addition, processor 200 may generate a signal indicative of the alarm condition and provide it to transmitter 206 for transmission to a remote device, such as a home or office base station, or to a remote monitoring station located remotely from the structure being monitored. The signal generated by processor 200 may additionally comprise other information, such as the direction of movement, a time that the movement occurred, an identification of which door or window has detected the movement, etc.

It should be understood that in the previous example, any one or a combination of variations to the method for determining an alarm condition. For example, instead of a fixed value associated with voltage and time margins, both of these margins could be defined as a percentage, e.g., "400 millivolts, plus or minus 8%", and "10 milliseconds, plus or minus 10%", respectively. In another embodiment, a greater or a fewer spikes could be analyzed before determining whether a door or window has been opened. In yet another embodiment, the time periods between spikes could be different from one another, rather than the same 10 milliseconds as used in the example above. Other variations are contemplated as well.

Figure 6:
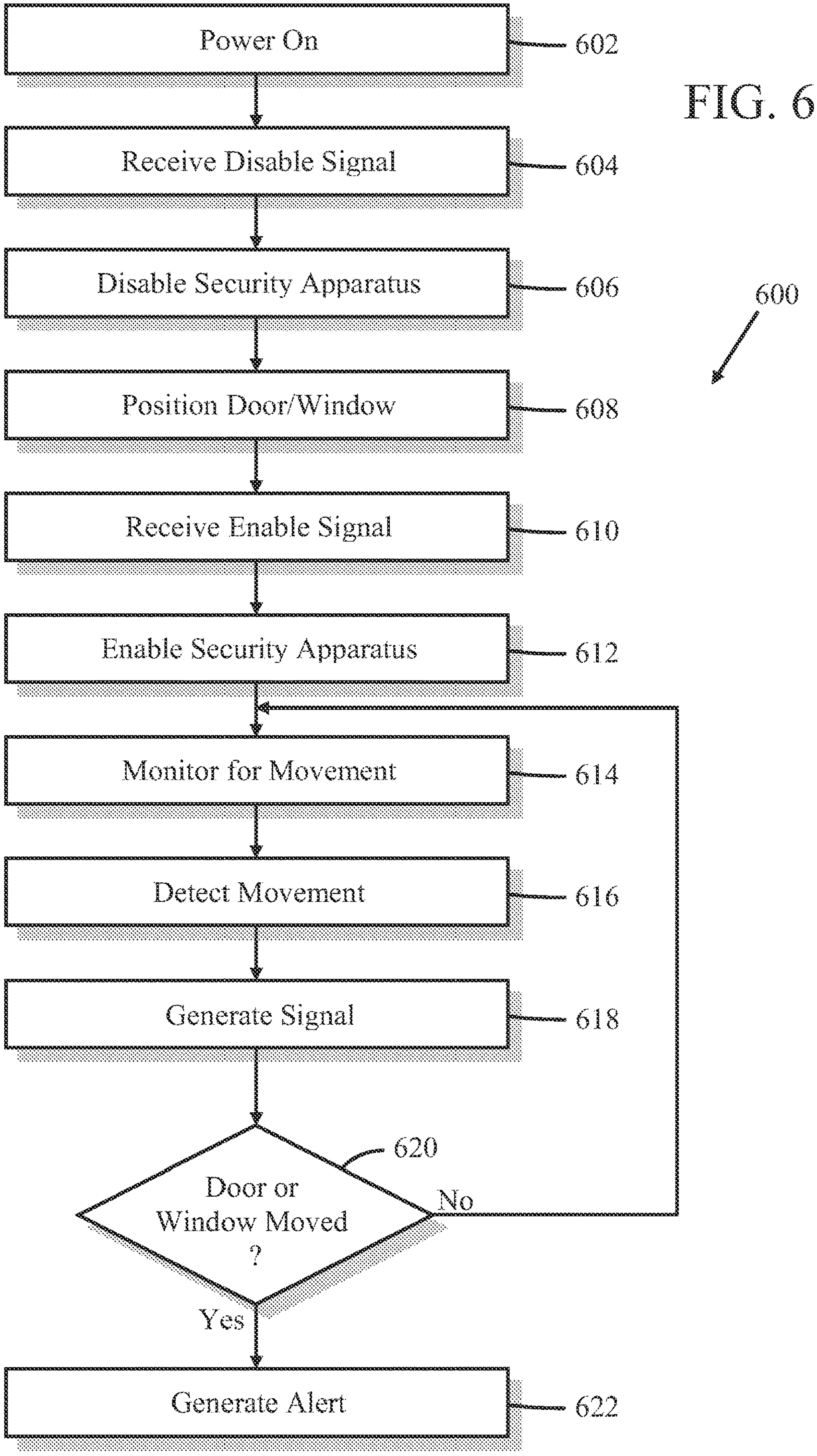
FIG. 6 is a flow diagram illustrating another embodiment of a method for providing an alarm for a door or a window using a motion-sensing device.

FIG. 6 is a flow diagram illustrating another embodiment of a method 600 for providing an alarm for a door or a window using a motion-sensing device.

At block 602, security apparatus 106 attached to a door or a window is powered on by a user. At the time of power-up, the door or window is in an initial position relative to a fixed object, such the side of a window frame or a door frame. For the present discussion, it is assumed that security apparatus 106 is attached to a moveable portion 102 of a window 104 and that the movable portion 102 abuts left edge 116, as shown in FIG. 1*c*. However, the concepts discussed herein can be applied to a security apparatus 106 attached to a door.

After being powered up, security apparatus 106 monitors window 104 for any movement of movable portion 102, as discussed above with respect to the method shown in FIG. 3.

At some future point in time, a user may want to move the door or window into a different position. For example, a homeowner may want to open window 104 slightly to let in a cool breeze and not trip security apparatus 106. Thus, at block 304, a signal is received by processor 200 via user interface 204 instructing processor 200 to disable security device 106. This is typically achieved by the user pressing a "momentary" pushbutton as part of user interface 204. Pressing this button generates the signal that is sent processor 200 instructing processor 200 to temporarily disable security apparatus 106, in one embodiment, as long as the pushbutton is depressed. The term "temporarily disable" means to temporarily a) disable motion sensor 208, b) disable an amplifier associated with a speaker that generates alerts (as part of user interface 204), c) attenuate or mute the volume from a speaker that generates alerts, d) disable transmitter 206, e) change the values stored in memory 202 to values that cannot be achieved by signals from motion sensor 208, f) inhibit or disable processor 200's ability to receive, process, and/or determine whether a signal from motion sensor 208 relates to movement of the window, f) any other way to prevent security apparatus 106 from generating alerts, and/or g) a combination of any of the foregoing.

At block 606, processor 200 disables security apparatus using one or a combination of ways as discussed above.

After security apparatus 106 has been disabled by processor 200 at block 606, the user may position the window without generating an alert by sliding the movable portion 102 in a direction away from the closed position. In other words, with reference to FIG. 1, the user slides movable portion 102 to the right, away from left edge 116. If movable portion 102 was in an open initial position, the user may position movable portion 102 closer or further away from left edge 116. In an embodiment where security apparatus 106 is disabled by pressing a momentary pushbutton, the user generally continues to depress the pushbutton until the desired window location is achieved.

At block 610, a signal is received by processor 200 from user interface 204 that instructs processor 200 to re-enable security apparatus 106. The signal is generated by the user when the desired window opening 118 is achieved. For example, the user may release a momentary pushbutton.

Depending on how security apparatus 106 was disabled at block 606, processor 200 generally reverses the action taken in block 606 to achieve re-enablement at block 612.

At block 614, processor 200 and/or motion sensor 208 monitors for movement of the window. In one embodiment, components of security apparatus 106 maintain a low-power state of operation while motion sensor 208 monitors for movement of the window. Motion sensor 208 may be designed to also maintain a low-power state until movement is detected, then energizes other parts of its circuitry to provide signals to processor 200 indicative of the movement, for example, a signal related to acceleration, velocity, or position of the window. Motion sensor 208 may also provide a signal to processor 200 and/or other circuitry alerting processor 200/other circuitry to the initial detection of movement, thereby allowing processor 200/other circuitry to enter an active state of operation.

At block 616, motion sensor 208 detects an initial movement of security apparatus 106 by evaluating acceleration, velocity, angular velocity, and/or position of the window to which security apparatus 106 is attached as provided by motion sensor 208. Generally, this occurs upon an initial change in acceleration, velocity, angular velocity, or position of the window.

At block 618, motion sensor 208 generates a signal relating to the initial and/or subsequent movement of the window/security apparatus 106. Such a signal may comprise an analog voltage or current, or one or more digital signals, an example of which is shown in FIG. 4, as explained previously. The signal generated at block 618 is typically provided to processor 200.

At block 620, processor 200 receives the signal generated by motion sensor 208 and determines whether the signal from motion sensor 208 indicates an alarm condition. This may be achieved in a variety of ways, discussed previously with reference to method 300, above.

Figure 7:
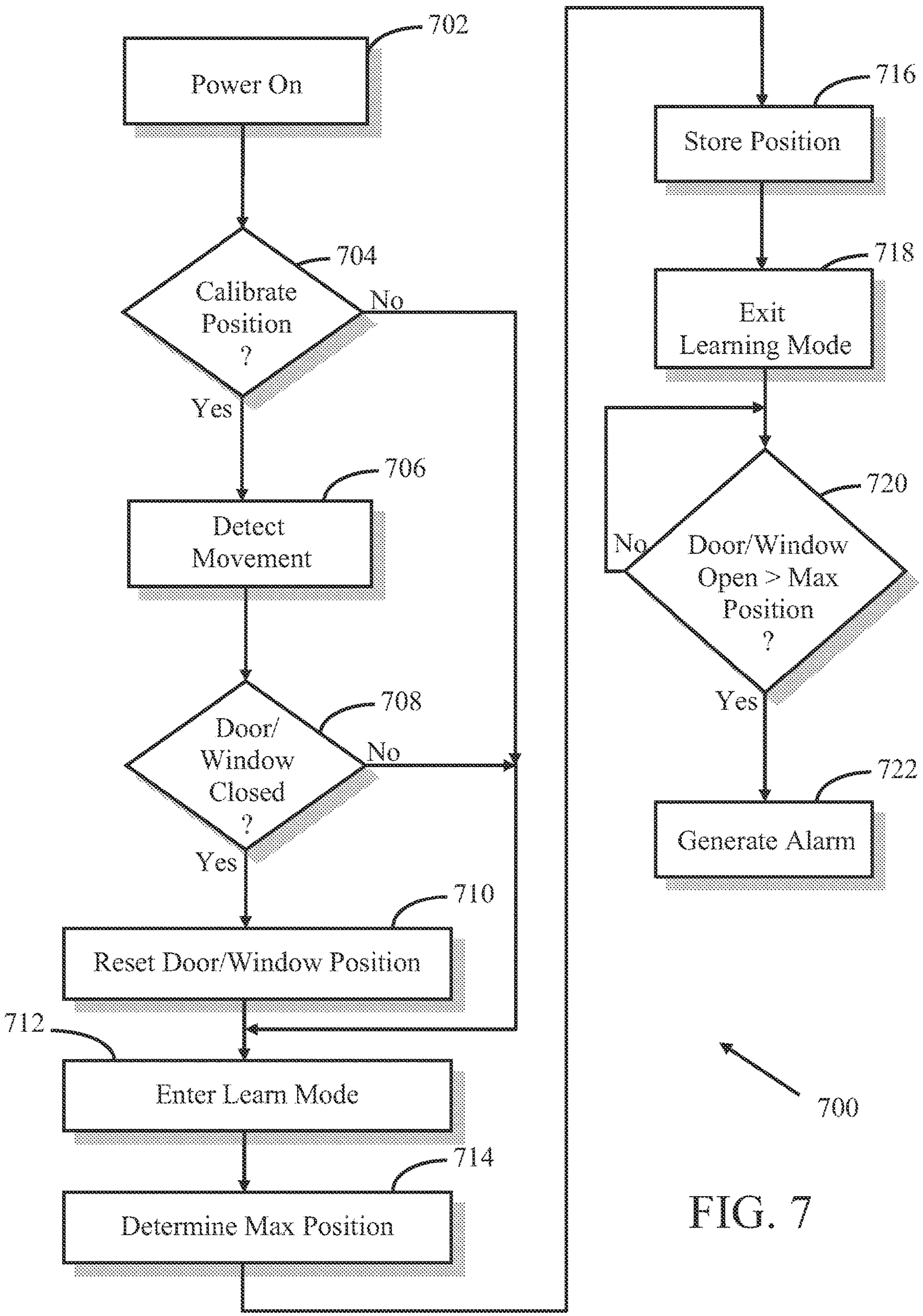
FIG. 7 is a flow diagram illustrating another embodiment of a method for providing an alarm for a door or a window using a motion-sensing device.

FIG. 7 is a flow diagram illustrating another embodiment of a method 700 for providing an alarm for a door or a window using a motion-sensing device. In particular, method 700 describes a process for allowing a door or window to be opened within a range of positions without generating an alert.

At block 702, security apparatus 106 attached to a door or a window is powered on by a user. At the time of power-up, in one embodiment, a movable portion of the door or window may be in any position, from closed to completely open. If this is the case, then the precise location of movable portion 102 or door 112 may not be known and may be indicated by user interface 204, e.g., a red indication on an LED. Thus, a calibration process may be performed, at blocks 706-710, if desired by a user (block 704). The calibration process may simply comprise shutting the window by the user, as explained below.

At block 706, a user closes the door or window. In response, motion sensor 208 detects an initial movement of the door or window, a short time period where the door or window is moving towards closure, and then, typically, a sudden deceleration as the door or window comes in contact with door frame 100 or a window edge, for example window left edge 116 or window bottom edge 120. Motion sensor 208 sends an electronic signal representative of these events to processor 200.

At block 708, processor determines if the door or window has been closed by comparing the electronic signal from motion sensor 208 to one or more data points stored in memory 202 representative of such an event. For example, the data points may comprise a representative waveform of an initial acceleration of a representative door or window in a direction towards a closed door or window position, followed by a brief period of widely-variable acceleration, followed by a large deceleration. Processor 200 compares the electronic signal from motion sensor 208 to the data points representing a door or window closing and determines that the door or window has been closed if the electronic signal substantially matches the data points. If processor 200 determines that the door or window has been closed, processing continues to block 710. If the electronic signal from motion sensor 208 does not indicate a door or window closing, processing continues to block 712 or, alternatively, blocks 706 and 708 may be repeated until processor 200 detects a window-closed event.

It should be noted that part of the comparison process at block 708 involves determining that the door or window is moving in a direction of travel towards a closed position, based on the electronic signal form motion sensor 208, as discussed above with respect to the method of FIG. 3. Otherwise, a sudden opening of a door or window into a fully-open position could generate a very similar electronic signal from motion sensor 208, e.g., a sudden increase in acceleration, followed by a brief period of widely-variable acceleration, followed by a large deceleration. To distinguish between these two events, the data points typically provide an indication of the direction of door or window travel. For example, the data points may indicate either a positive or negative initial spike in amplitude as an indication of direction.

In another embodiment, to aid in distinguishing between door/window fully-open and door/window shut events, the user is instructed to shut the door/window within a predetermined time period after an event, such as installing a new power source into security apparatus 106, providing an indication to processor 200 via user interface 204, installing activating a switch by installing a cover over circuitry comprising security apparatus 106, or other methods. After one of these events, the user will shut the door or window with at least a predetermined amount of force for motion sensor 208 to easily detect as the door/window shuts.

In block 710, processor resets a calculated door or window position to a base value, wherein the window position is based relative to the closed position. The calculated door or window position is typically a continually-updated estimate, calculated by processor 200, of the position of a movable portion of door or window, typically relative to a closed position. If processor 200 detects that a door or window has been closed, processor 200 may reset the calculated door or window position to zero, indicating a base value. Thereafter, the position of the door or window may be calculated in reference to this value or position as electronic signals are received from motion sensor 208. In one embodiment, an indication provided by user interface changes state, such as a multi-colored LED changing color from red to green.

At block 712, a user places security apparatus 106 into a "learn" mode. The learn mode allows the user to place the door or window into an open position without generating an alarm. For example, a user may want to be able to open a sliding glass door approximately eight inches to let a dog into the user's home without generating an alarm. The learn mode programs security apparatus 106 to allow the door to be opened to the position set by the user during learn mode without generating an alarm. The learn mode may be entered by a user p At block 714, while in learn mode, the user positions the door or window to a user-selected maximum allowed position, for example, opening the sliding door ten inches from the closed position. Motion sensor 208 generates an electronic signal indicative of acceleration, velocity, angular velocity, and/or position of the door or window at it is moved to the user-selected maximum allowed position. Processor 200 determines a calculated door or window position based on the electronic signal from motion sensor 208, as discussed above with respect to the method shown in FIG. 3.

At block 716, the user-selected maximum allowed position, calculated at block 714, is stored within memory 202. Security apparatus 106 may alert the user that it has successfully recorded the user-selected maximum allowed position using a visual or audible signal provided via user interface 204.

At block 718, security apparatus 106 exits the learn mode, typically after the user provides an indication via user interface 204. In another embodiment, the learn mode could be terminated automatically after the user-selected maximum allowed position has been stored at block 716.

At block 720, processor 200 monitors electronic signals generated by motion sensor 208 to determine if a door or window has been opened by an amount exceeding the user-selected maximum allowed position stored in memory 202, e.g., whether a door or window has been opened wider than the user-selected maximum allowed position.

In one embodiment, processor 200 determines whether a door or window has been opened by an amount exceeding the user-selected maximum allowed position by periodically calculating a current position of the door or window, using electronic signals from motion sensor 208, and comparing the current position to the user-selected maximum allowed position stored in memory 202. Calculating the door position can be performed a number of different ways, such as from a direct position indication from motion senor 208, by integrating a velocity signal, by twice integrating an acceleration signal, etc. If it is determined that a door or window has been opened by an amount exceeding the user-selected maximum allowed position, processing continues to block 722, where an alert is generated, as discussed above.

Throughout this specification, the term "data points" have been used to describe predefined waveforms, signatures, and/or profiles, stored in memory 202, indicative of certain events such as a door or window closed, movement of the door or window, a movement of the door or window in a particular direction, a movement of the door or window greater than a predetermined amount, a movement of the door or window in a particular direction more than a predetermined amount, a velocity change of the door or window, a position change of the door or window, an acceleration of the door or window, an acceleration of the door or window greater than a predetermined amount, etc. One or more sets of data points describing a particular event, and/or one or more sets of data points defining different events, can be provided from an external source. For example, during manufacture of security apparatus 106, memory 202 could be programmed with one or more sets of such data points.

Figure 8:
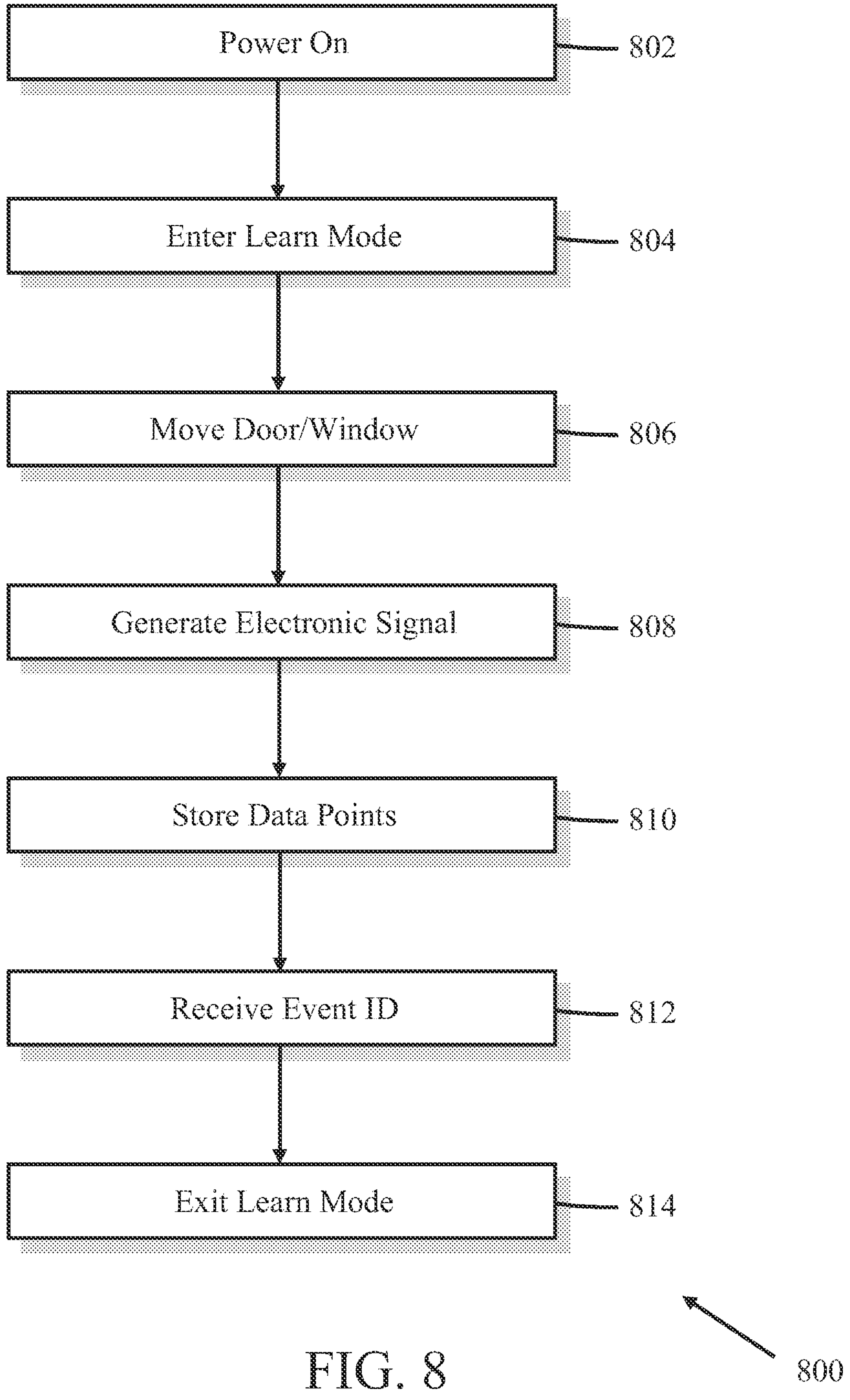
FIG. 8 is a flow diagram illustrating a method of generating data points used in the methods illustrated by FIGS. 3 and 6.

In another embodiment, data points may be generated by a user of security apparatus 106, as shown in the flow diagram of FIG. 8.

At block 802, security apparatus 106 attached to a door or a window is powered on by a user.

At block 804, a user places security apparatus 106 into a "data point learn" mode. The data point learn mode allows the user to program custom profiles into memory 202, each profile representing a particular event, such as a door or window closed event, door or window movement, or any of the events listed above. The data point learn mode is typically entered when a user of security apparatus 106 indicates a desire to enter this mode of operation by providing an indication to processor 200 via user interface 204.

At block 806, after security apparatus 106 is in the data point learn mode, the user moves the door or window to achieve a particular event, such as movement, movement in a particular direction, door or window closed, etc.

At block 808, motion sensor 208 generates an electronic signal indicative of acceleration, velocity, angular velocity, and/or position of the door or window at it is moved.

At block 810, processor 200 receives the electronic signal from motion sensor 208 and stores the electronic signal, or representative samples thereof, into memory 202. Security apparatus 106 may alert the user that it has successfully recorded the data points associated with the particular event via user interface 204.

At block 812, an identification of the event is typically provided to processor 200 by the user via user interface 204. This may be necessary to distinguish different types from one another. In one embodiment, processor 200 generates a query to the user and provides the query to user interface 204 asking the user to enter a first indication if the event comprises a "door or window shut" event, a second indication if the event comprises a "door fully-open" event, a third indication if the event comprises movement of a door or window from left to right, a fourth indication if the event comprises movement from right to left, etc.

It should be understood that the process described above with respect to block 812 could be performed between block 804 and 806, prior to the user operating the door or window, to define the type of event.

At block 814, security apparatus 106 exits the data point learn mode, typically after the user provides an indication via user interface 204. In another embodiment, the learn mode could be terminated automatically after the user selects the type of event at block 812.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method, performed by a magnet-less door or window sensor for monitoring a door or a window, comprising:

generating an electronic signal by a motion sensor of the magnet-less door or window sensor when the door or the window monitored by the magnet-less door or window sensor moves; and determining that an alarm condition has occurred when the electronic signal from the motion sensor exceeds a predetermined threshold stored in the memory for more than a predetermined time stored in a memory of the magnet-less door or window sensor.

2. The method of claim 1, wherein the magnet-less door or window sensor comprises an accelerometer and the method further comprises:

entering into a low-power state of operation;

determining that an initial electronic signal from the accelerometer has been generated after entering the low-power state of operation;

in response to determining that the initial electronic signal from the accelerometer has been generated, entering into a normal mode of operation; and while in the normal mode of operation, processing an additional electronic signal from the accelerometer to determine whether the door or the window is being opened.

3. The method of claim 1, wherein the motion sensor comprises an accelerometer and the method further comprises:

determining that a false alarm has occurred when an additional electronic signal from the accelerometer exceed the predetermined threshold stored in the memory for more than a second predetermined time greater than the first predetermined time.

4. The method of claim 1, further comprising:

determining a direction of movement of the door or the window based on an additional electronic signal from the motion sensor; and determining that the alarm condition has occurred when the additional electronic signal indicates that the door or window is being moved towards an open position.

5. The method of claim 1, further comprising:

determining that one or more additional electronic signals from the motion sensor exceed a second predetermined threshold greater than the first predetermined threshold; and determining that the door or window has been shut when one or more of the additional electronic signals exceed the second predetermined threshold.

6. The method of claim 1, wherein the predetermined threshold comprises a series of data points stored in the memory and determining that an alarm condition has occurred comprises:

comparing the electronic signal to the data points; and determining that the alarm condition has occurred when the electronic signal exceeds one of the data points stored in the memory.

7. The method of claim 6, further comprising:

entering into a learn mode;

recording one or more additional electronic signals while opening the door or the window; and storing the one or more electronic signals as the data points in the memory.

8. The method of claim 1, further comprising:

temporarily disabling the magnet-less door or window sensor;

while the magnet-less door or window sensor is temporarily disabled, ignoring additional electronic signals from the motion sensor while the door or window is being moved to an open position;

re-enabling the magnet-less door or window sensor while the door or window is in the open position; and beginning to monitor still further electronic signals form the motion sensor to determine when the door or window has been displaced from the open position.

9. The method of claim 1, further comprising:

determining a direction of travel of the door or window after determining that the door or window has been displaced; and determining that the alarm condition has occurred when the door or window has been displaced in a direction of travel indicative of the door or window becoming further opened from the open position.

10. A magnet-less door or window sensor for monitoring a door or a window, comprising:

a motion sensor;

a non-transitory memory for storing processor-executable instructions; and a processor coupled to the motion sensor and the non-transitory memory, for executing the processor-executable instructions that causes the magnet-less door or window sensor to:

generate, by the motion sensor, electronic signals when the door or the window monitored by the magnet-less door or window sensor moves; and determine, by the processor, that an alarm condition has occurred when one of the one or more electronic signals from the motion sensor exceeds a predetermined threshold stored in the memory for more than a predetermined time stored in the memory.

11. The magnet-less door or window sensor of claim 10, wherein the motion sensor comprises an accelerometer, wherein the processor-executable instructions comprise further instructions that causes the magnet-less door or window sensor to:

enter into a low-power state of operation;

determine that an initial electronic signal from the accelerometer has been generated after entering the low-power state of operation;

in response to determining that an initial electronic signal from the accelerometer has been generated, enter into a normal mode of operation; and while in the normal mode of operation, process additional electronic signals from the accelerometer to determine whether the door or the window is being opened.

12. The magnet-less door or window sensor of claim 10, wherein the motion sensor comprises an accelerometer, wherein the processor-executable instructions comprise further instructions that causes the magnet-less door or window sensor to:

determine that a false alarm has occurred when additional signals from the accelerometer exceed the predetermined threshold stored in the memory for more than a second predetermined time greater than the first predetermined time.

13. The magnet-less door or window sensor of claim 10, wherein the processor-executable instructions comprise further instructions that causes the magnet-less door or window sensor to:

determine a direction of movement of the door or the window based on additional electronic signals from the motion sensor;

wherein the instructions for determining that the alarm condition has occurred comprise instructions that causes the magnet-less door or window sensor to:

determine that the additional electronic signals indicate that a door or window indicates that the door or window is being moved towards an open position.

14. The magnet-less door or window sensor of claim 10, wherein the processor-executable instructions comprise further instructions that causes the magnet-less door or window sensor to:

determine that one or more additional electronic signals from the motion sensor exceed a second predetermined threshold greater than the first predetermined threshold; and determine that the door or window has been shut when one or more of the additional electronic signals exceed the second predetermined threshold.

15. The magnet-less door or window sensor of claim 10, wherein the predetermined threshold comprises a series of data points stored in the memory, and the processor-executable instructions for determining that an alarm condition has occurred comprises further instructions that causes the magnet-less door or window sensor to:

compare one or more of the electronic signals to the data points; and determine that the alarm condition has occurred when one or more of the electronic signals match at least some of the data points stored in the memory.

16. The magnet-less door or window sensor of claim 15, wherein the processor-executable instructions comprise further instructions that cause the magnet-less door or window sensor to:

enter into a learn mode;

record one or more additional electronic signals from the motion sensor while opening the door or the window; and store the one or more electronic signals as the data points in the memory.

17. The magnet-less door or window sensor of claim 10, wherein the processor-executable instructions comprise further instructions that causes the magnet-less door or window sensor to:

temporarily disable the magnet-less door or window sensor;

while the magnet-less door or window sensor is temporarily disabled, ignore additional signals from the motion sensor while the door or window is being moved to an open position;

re-enable the magnet-less door or window sensor while the door or window is in the open position; and begin to monitor still further electronic signals form the motion sensor to determine when the door or window has been displaced from the open position.

18. The magnet-less door or window sensor of claim 10, wherein the processor-executable instructions comprise further instructions that causes the magnet-less door or window sensor to:

determine a direction of travel of the door or window after determining that the door or window has been displaced; and determine that the alarm condition has occurred when the door or window has been displaced in a direction of travel indicative of the door or window becoming further opened from the open position.

* * * * *